(12) United States Patent
Branlard et al.

(10) Patent No.: US 6,511,714 B2
(45) Date of Patent: Jan. 28, 2003

(54) PROCESS FOR COMBATING THE APPEARANCE OF MIST DURING THE COATING OF FLEXIBLE SUPPORTS WITH A CROSSLINKABLE LIQUID SILICONE COMPOSITION IN A ROLL DEVICE

(75) Inventors: Paul Branlard, Lyons (FR); Frédéric Garnes, St-Genis Laval (FR); Yves Giraud, Sainte Foy les Lyon (FR); Christophe Guyot, Lyons (FR); Frédéric Magd, Lyons (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/888,617

(22) Filed: Jun. 26, 2001

(65) Prior Publication Data

US 2002/0058112 A1 May 16, 2002

(30) Foreign Application Priority Data

Sep. 1, 2000 (FR) .............................. 00 11193

(51) Int. Cl.⁷ .............................. B05D 3/02; B05D 3/06
(52) U.S. Cl. ........................ 427/503; 427/515; 427/180; 427/387
(58) Field of Search ................................ 427/387, 180, 427/503, 515

(56) References Cited

U.S. PATENT DOCUMENTS 3,503,782 A    3/1970    Ayres
4,105,569 A  * 8/1978    Crossfield ................... 252/8.6
4,248,751 A  * 2/1981    Willing ........................ 427/387
4,806,391 A    2/1989    Shorin
5,698,655 A    12/1997   Chung et al.

FOREIGN PATENT DOCUMENTS

| EP | 0 716 115 A2 | 6/1996 |
| EP | 0 972 811 A1 | 1/2000 |
| WO | WO 99/18155 | 4/1999 |

* cited by examiner

Primary Examiner—Erma Cameron

(57) ABSTRACT

The invention relates to a process for combating the appearance of mist (misting) during the coating of flexible supports with at least one liquid silicone (RTV polyaddition) composition which is a precursor of silicone coating(s) using a roll coating device operating at high speed. The targeted aim is to increase the speed of appearance of the misting and subsequently to improve the appearance, the coverage and the mechanical properties of the silicone coating and industrial hygiene. For this, use is made of a liquid coating composition obtained by mixing:

a silicone phase comprising one or more POSs (A) and optionally one or more (crosslinking) compound(s) (B), the viscosity η of which at 25° C. is between 100 and 800 mPa·s;

with 1 to 10% by weight of noncellulose antimist particles (talc, silica, kaolin, $TiO_2$), the $D_{50}$ (in μm) of which is: $0.01 \leq D_{50} \leq 2$;

and optionally with a liquid (D)—water/solvent.

24 Claims, No Drawings

PROCESS FOR COMBATING THE APPEARANCE OF MIST DURING THE COATING OF FLEXIBLE SUPPORTS WITH A CROSSLINKABLE LIQUID SILICONE COMPOSITION IN A ROLL DEVICE

The invention relates to the general field of the silicone coating on high speed rolls of various flexible supports, such as sheets of paper or synthetic polymer (polyolefin, polyester and the like), or alternatively of textile.

More specifically, the invention relates to the coating of flexible materials with liquid compositions comprising one or more polyorganosiloxanes (POSs) which can be crosslinked by polyaddition, by polycondensation (in emulsion), by the cationic route or by the radical route, so as to form a protective film or coating having in particular adhesion-resistant and/or hydrophobic properties.

The flexible supports can be paper, board, plastic film or metal film. The applications of these silicone-coated supports are, for example: paper for foodstuffs (pastry molds, packaging), adhesive label/tape, seal, and the like.

The coating of these flexible supports with crosslinkable liquid silicones is carried out on coating devices which operate continuously and at very high speed. These devices comprise coating heads composed of several rolls, including in particular a pressure roll and a coating roll, which roll is fed continuously with crosslinkable liquid silicone composition, by means of a series of rolls placed next to one another. The strip of flexible supports moves at high speed between the pressure roll and the coating roll to be coated on at least one of its faces with a silicone film intended to crosslink via crosslinking means positioned downstream of the coating head. These crosslinking means can be emitters of heat, of radiation (e.g. UV radiation) or of electron beams, for example.

In the drive to be ultraproductive, manufacturers of flexible supports coated with adhesion-resistant silicone are demanding liquid silicone coating formulations suitable for increasingly high linear speeds of forward progression of the strip of flexible supports. The economic factor is obviously not insignificant in this search for novel silicone formulations for high speed coating.

In point of fact, it is known that high speeds on continuous coating machines are synonymous with problems of transfer of the silicone liquid film from the coating roll onto the strip of forwardly progressing flexible support. These problems of transfer (splitting) are reflected in particular by the appearance of a mist or aerosol (misting, fogging) in the surroundings of the coating head and more particularly at the points of contact between the rotating rolls and/or between the coating roll and the flexible support to be coated. The density of this mist or of this aerosol increases when the linear speed of forward progression and thus the rotational speed of the rolls increases.

The consequence of this phenomenon is first of all a loss in consumable and in particular a deposition of droplets of coating liquid on the support downstream (for example in the oven) which seriously harms the quality of the coating: orange peel appearance, lack of coverage, mechanical qualities of the crosslinked coating (ruboff), adhesion resistance.

In addition, this undesirable formation of mist has harmful consequences with regard to industrial hygiene and the safety of the operators, who are exposed in the vicinity of the roll coating device to a high aerosol content. This can prove to be harmful.

Furthermore, the misting results in the rapid fouling of the roll coating device, leading to maintenance restrictions and premature wear.

In order to guard against the consequences of this mist, a suction system, which makes it possible to capture said mist, is generally positioned around the coating head.

Furthermore, a number of adjustments of the coating head to thwart this phenomenon are known to a person skilled in the art. A few examples thereof will be mentioned below:

lowering the speed at the expense of the productivity;

decreasing the level of deposition of silicone at the expense of the properties of the silicone-coated flexible support which it is desired to obtain (appearance, coverage, adhesion resistance, mechanical properties);

increase in the difference between the tangential speed of the coating roll and the linear speed of the paper. However, beyond a certain differential, the homogeneity of the coated layer is seriously disrupted. Furthermore, this makes it possible to reduce the density of the mist without for all that eliminating it sufficiently to allow a significant increase in the coating speed;

increase in the pressure between the coating roll and the pressure roll; here again, within a certain limit and without advantageous suppression of the phenomenon of formation of mist.

Another approach for combating the formation of mist in roll coating machines consists in exerting an effect on the formulation of the liquid silicone coating composition.

According to this approach, it is known to reduce the number-average degree of polymerization of the POSs constituting the silicone coating liquid and consequently to reduce the viscosity of the silicone coating bath in order to limit the density of the mist.

These known methods suffer from a serious disadvantage, which is that of substantially modifying the properties and in particular the adhesion resistance of the silicone-coated flexible support which it is desired to obtain.

Mention may be made, by way of illustration of this approach through the silicone formulation, of European Patent Application EP-0 716 115, which discloses a process for manufacture of a silicone composition for high speed coating with rolls, this composition being presented as making possible the reduction in the mist density. According to this process, use is made of a polydimethylmethylhydrosiloxane with trimethylsilyl ends with a degree of polymerization of 12 and 0.01% of a polydimethylsiloxane substituted by perfluoethylbutyl and methylvinyl functional groups, the ends of which are of the dimethylvinylsiloxyl type, and with a degree of polymerization of 300, and polypropylene glycol and optionally a stearyl or oleyl alcohol. This results in polydimethysiloxanes functionalized by polyoxypropylene groups. These functionalized PDMSs are used in combination with other functionalized PDMSs, e.g. functionalized by hexenyl units, and with a platinum-based hydrosilylation catalyst, to form silicone coating compositions which make it possible to reduce the formation of mist. The functionalization units can be hydrophobic residues, such as stearic or oleic acid residues.

It is clear that such compositions are relatively complex and thus expensive to obtain. Furthermore, they still remain capable of improvement as regards combating the formation of mist in silicone coating on rolls at high speed.

U.S. Pat. No. 4,806,391 relates to silicone-based inks and varnishes and more specifically to a process for the application of these inks/varnishes to a substrate using a roll coating machine operating at high speed. This patent discloses in particular compositions comprising polydimethylsiloxanes PDMSs with vinyl ends with a viscosity at 25° C. of between 15 000 and 50 000 mPa.s. (Examples XII and XIII: 30 000 and 18 000 mPa.s at 25° C. respectively). These liquid coating compositions also comprise a platinum-based catalyst and a rheological additive composed of silica with a high specific surface area, in particular fumed silica, in a proportion of less than 1% and less than 5% by weight on a dry basis in Examples XII and XIII respectively.

This composition also comprises a polymethylhydrosiloxane capable of reacting with the Si—Vi POS in the presence of a platinum catalyst.

According to this patent, it is the choice of a specific viscosity interval between 15 000 and 50 000 mPa.s for the majority Si—Vi POS which makes it possible to introduce a solution to the problem of formation of mist. In reality, in this patent, only the liquid coating compositions devoid of rheological additive of the silica type were tested in a roll coating device operating at high speed. From the results obtained, the acceptable reduction in the mist/rheological behavior compromise lies in the viscosity interval of between 10 000 and 60 000 mPa.s at 25° C.

This document teaches nothing regarding a possible positive effect of the rheological additive with respect to combating the formation of mist.

U.S. Pat. No. 6,057,033 discloses silicone compositions intended to be coated onto flexible supports to form, after crosslinking by the cationic route under UV radiation, to an adhesion-resistant coating. In addition to POSs, these compositions comprise cellulose fibers having a mean length of between 15 and 100 µm and a mean thickness of between 5 and 40 µm. The POSs employed are POSs functionalized by crosslinking groups of the acryloxy or methacryloxy type which make possible crosslinking by the radical route under UV radiation.

The cellulose fibers incorporated in the composition make it possible to introduce a solution to the technical problem, which is to obtain a nonbrittle crosslinked adhesion-resistant silicone coating. The cellulose fibers are presented as providing improvements as regards the transfer of the silicone coating film onto the support, the resistance to cutting, the mechanical properties (tensile strength and tear strength), the fixing of the coating to the paper, the decrease in the absorption of the coating liquid within the paper, and incidentally the reduction in the formation of mist.

On the latter point, U.S. Pat. No. 6,057,033 gives no quantitative component for assessing the reduction in mist brought about by the cellulose fibers. There is every reason for believing that this reduction remains entirely insufficient.

Furthermore, it should be noted that the use of particulate fillers, for example siliceous fillers, in liquid silicone compositions intended to be coated onto flexible supports, for example of paper, to form adhesion-resistant crosslinked coatings is a characteristic which has been known for a very long time, that is to say since the appearance of adhesion-resistant silicone coatings (cf. U.S. Pat. No. 3,503,782).

Mention may also be made, for the record, of Japanese Patent Application JP-62 64 011, which discloses a coating liquid which comprises a film-forming resin and a solvent and which also comprises wax particles with a diameter of between 1 and 10 µm, the diameter of the largest particle being at most equal to 150% of the thickness of the wet coating film applied to the support. Such a coating liquid would make possible an increase in the coating speed of at least 10 to 30 m/min, a priori by virtue of a limitation on the formation of mist.

The teaching of such a document is to be excluded as it does not relate to silicone coatings.

In such a state of the art, one of the essential objects of the invention is to provide an efficient process for combating the appearance of mist during the coating of flexible supports with a liquid silicone composition which is a precursor of crosslinked coatings, this coating being carried out using a roll coating device operating at high speed.

Another essential object of the invention is to provide an economic and simple process for combating the appearance of mist during the coating of flexible supports with a silicone composition intended to be crosslinked, this coating being carried out in a roll coating device operating at high speed.

Another essential object of the invention is to provide a process for coating flexible supports at high speed on a roll device, in which the formation of mist is reduced, so that the speed of appearance of this disturbance is significantly increased.

Another essential object of the invention is to provide a novel additive which makes it possible to reduce the formation of mist during the high speed coating on rolls of flexible materials by means of silicone compositions which can be crosslinked into adhesion-resistant coatings.

Another essential object of the invention is to provide a process for combating the appearance of mist in the context of the coating of flexible supports with a silicone composition which can be crosslinked into adhesion-resistant coatings using a roll coating device, said process having to have positive effects on the appearance and/or the coverage and/or the mechanical properties (ruboff) and/or the adhesion-resistant properties of the crosslinked coating which it is desired to obtain on at least one of the faces of the flexible support.

All these objects, among others, are achieved by the present invention, which relates first of all to a process for combating the appearance of mist (misting) during the coating of flexible supports with at least one liquid silicone composition which is a precursor of silicone coating(s) using a roll coating device, the liquid composition comprising:

A—at least one polyorganosiloxane (POS) which can be crosslinked by polyaddition, by polycondensation, by the cationic route or by the radical route;

B—optionally at least one crosslinking organosilicon compound;

C—optionally at least one catalyst of the crosslinking reaction;

characterized in that use is made of a liquid coating composition obtained by mixing:

a silicone phase comprising one or more POSs (A) and optionally one or more (crosslinking) compound(s) (B) and the viscosity η of which at 25° C. is less than 2 000 mPa.s, preferably between 50 and 1 400 mPa.s and more preferably still between 100 and 1 000 mPa.s;

with noncellulose antimist particles, the particle size of which, given by their $D_{50}$ (in µm), is such that:

|  | $D_{50} \geq 50$ |
| --- | --- |
| preferably | $0.001 \leq D_{50} \leq 5$ |
| and more preferably still | $0.01 \leq D_{50} \leq 2$ | these antimist particles being incorporated in the liquid silicone composition in a proportion of at most 30% by weight, preferably in a proportion of 0.1 to 15% by weight and more preferably still in a proportion of 1 to 10% by weight, and optionally with a liquid compound (D) composed:

i. of a diluent and/or a solvent comprising a non-organosilicon or organosilicon organic compound which may or may not be capable of reacting with the compound(s) (A), ii. and/or of water, in the case of the use of an emulsified system.

It is to the credit of the inventors to have been able to understand the phenomenon which presides over the formation of mist during the transfer of the liquid silicone layer from the coating roll onto the forwardly progressing strip of flexible supports to be coated. Thus, starting from the observation that it is advisable to break as soon as possible after their formation the filaments of liquid silicone which are created during the transfer, the inventors have carried out a selection of noncellulose antimist particles, these particles having a specific particle size and being present in an amount carefully chosen to break, at an early stage, the filaments of silicone liquid during the transfer from the coating roll onto the forwardly progressing strip, without resulting in unacceptable disruptions with regard to the viscosity of the liquid composition.

The result obtained by virtue of the invention is efficient control of the formation of mist, which is reflected by a significant increase in the speed of appearance of said mist in a roll coating system operating at high speed.

Within the meaning of the invention, the $D_{50}$ parameter is the median size of the particle size distribution. It can be determined on the cumulative particle size distribution graph, obtained by one of the analytical techniques mentioned below, by determining the size corresponding to the cumulative total of 50% of the population of the particles. In concrete terms, a $D_{50}$ of 10 $\mu$m indicates that 50% of the particles have a size of less than 10 $\mu$m. The particle size measurements can be carried out by conventional techniques, such as sedimentation, laser diffraction, optical microscopy coupled to image analysis, and the like.

The particles which are considered here may be individual particles or aggregates, undissociated in the silicone phase, formed by a cohesive assemblage of individual particles having sizes of less than the $D_{50}$. The particle size referred to is that of the particles as they are obtained after mixing with the silicone phase. It should be noted that it is possible to start from larger particles having a $D_{50} \geq 10$ $\mu$m and consisting of agglomerates formed by a dissociable assemblage of aggregates, provided that said agglomerates are capable of dissociating during the process of mixing the antimist particles (AMP) with the silicone phase to result in aggregates with a size $\leq 10$ $\mu$m.

All the viscosities dealt with in the present account correspond to a "Newtonian" dynamic viscosity quantity at 25° C., that is to say measured in a way known per se at a sufficiently low shear rate gradient for the viscosity measured to be independent of the rate gradient.

According to a preferred characteristic of the invention, the antimist particles are selected from the group consisting of:

carbon black
$SiO_2$
$CaCO_3$
$TiO_2$
$BaSO_4$
$Al_2O_3$
lime
talc
mica
ground quartz
natural or synthetic clays (kaolin, expanded or nonexpanded vermiculite)
powders based on synthetic polymer(s) other than a cellulose polymer
diatomaceous earths
and their mixtures;

silica, kaolin, talc and $TiO_2$ being particularly preferred; these particles optionally having been subjected to a surface treatment.

In accordance with the invention, the specific surface area is also an important parameter for antimist particles. Thus, the latter advantageously have a BET specific surface area (SS) of between 0.5 $m^2/g$ and 500 $m^2/g$, preferably between 2 and 400 $m^2/g$ and more preferably between 5 and 300 $m^2/g$.

In the case where the antimist particles are composed of silica, it should be pointed out that it can be colloidal silica, precipitated silica or pyrogenic silica.

These silicas are preferably used as is or can also, according to an alternative form, be subjected to a surface treatment using organosilicon compounds commonly employed for this use. These compounds include:

methylpolysiloxanes, such as hexamethyldisiloxane or octamethylcyclotetrasiloxane, methylpolysilazanes, such as hexamethyldisilazane or hexamethyltrisilazane, chlorosilanes, such as dimethyldichlorosilane, trimethylchlorosilane, methylvinyldichlorosilane or dimethylvinylchlorosilane, alkoxysilanes, such as dimethyldimethoxysilane, dimethylvinylethoxysilane, trimethylmethoxysilane or octyltriethoxysilane.

During this treatment, the silicas can increase their starting weight up to a level of 20%, preferably approximately 18%.

The antimist particles based on synthetic polymers are composed of polymers resulting from a conventional process for the emulsion copolymerization of one or more polymerizable organic monomers. These organic monomers are preferably chosen from:

a) alkyl (meth)acrylate, the alkyl part of which preferably comprises from 1 to 18 carbon atoms, in particular methyl acrylate, ethyl acrylate, propyl acrylate, n-butyl acrylate, isobutyl acrylate, amyl acrylate, lauryl acrylate, isolamyl acrylate, (2-(2-ethyl)hexyl) acrylate, octyl acrylate, methyl methacrylate, chloroethyl methacrylate, butyl methacrylate, (3,3-dimethylbutyl) methacrylate, ethyl methacrylate, isobutyl methacrylate, isopropyl methacrylate, phenyl methacrylate, butyl chloroacrylate, methyl chloroacrylate, ethyl chloroacrylate, isopropyl chloroacrylate or cyclohexyl chloroacrylate, b) α,β-ethylenically unsaturated esters of monocarboxylic acids, the acid part of which is nonpolymerizable and the unsaturated part of which preferably comprises from 2 to 14 carbon atoms and the acid part of which from 2 to 12 carbon atoms, in particular vinyl acetate, vinyl propionate, vinyl butyrate, alkyl acetate, vinyl versatate® (registered trademark for esters of α-branched $C_9$–$C_{11}$ acids), vinyl laurate, vinyl benzoate, vinyl trimethylacetate, vinyl pivilate and vinyl trichloroacetate, c) esters and hemiesters of α,β-ethylenically unsaturated polycarboxylic acids having from 4 to 24 carbon atoms, in particulate dimethyl, diethyl maleate, methyl and ethyl fumarate, or (2-ethylhexyl) fumarate, d) vinyl halogens, in particular vinyl chloride, vinyl fluoride, vinylidene chloride or vinylidene fluoride, e) vinylaromatics preferably exhibiting at most 24 carbon atoms and chosen in particular from styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-tert-butylstyrene, 4-dichlorostyrene, 2,6-dichlorostyrene, 2,5-difluorostyrene and 1-vinylnaphthalene, f) conjugated aliphatic dienes preferably exhibiting from 3 to 12 carbon atoms, in particular 1,3-butadiene, isoprene and 2-chloro-1,3-butadiene, g) α,β-ethylenically unsaturated nitriles preferably having from 3 to 6 carbon atoms, such as acrylonitrile and methacrylonitrile.

In accordance with the invention, it is possible to employ, as AMP, any other polymer—with the exception of cellulose polymers—which is preferably provided in the form of a powder obtained by processes known per se, for example: cryogenic milling, prilling, atomization, and the like.

These polymer powders can be, for example, polyamide or polytetrafluoroethylene (PTFE) powders.

The method of preparation of the liquid coating composition charged with antimist particles also constitutes one of the essential elements of the present invention.

Thus it is that it is preferable to mix at least a portion of the silicone phase with all or a portion of the antimist particles, which are provided in the dry pulverulent form and/or in the form of a suspension in a liquid (organic or aqueous liquid), preferably in the dry pulverulent form.

More specifically, the preferred methods of mixing are as follows:

either all the antimist particles are gradually mixed with the silicone phase in the continuous or dispersed form;

or all the antimist particles are gradually mixed with a fraction of the POS (A), this intermediate mixture subsequently being mixed with the silicone phase, in the continuous or dispersed form, comprising the residual fraction of the silicone phase.

More preferably still, the silicone phase/antimist particles mixing is carried out using a conventional mixer known for being dispersing in fluid media when operating at ambient temperature.

Mention may be made, by way of examples, of slow dispersers, static mixers, paddle mixers, single- or multiple-screw extruders, planetary mixers, hook mixers or slow dispersers.

According to a specific embodiment, corresponding to the case where the antimist particles are composed of treated or untreated pyrogenic and/or precipitated silica, the procedure is as follows:

in a first step, a portion of the silicone phase, in the continuous form, is gradually mixed with the siliceous antimist particles in a conventional mixer, known for being dispersing in fluid media and with a rotational speed of between 50 and 500 rev/min, preferably between 80 and 120 rev/min, at an ambient temperature (23° C.) for at least one hour, in a second step, the mixture thus obtained is brought with stirring to a temperature of between 100 and 200° C. for at least one hour, and, in a third step, at least one mixing of the remainder of the silicone phase with the mixture obtained in the second step is carried out, this (or these) additional mixing operation(s) preferably being carried out at ambient temperature.

In practice, the second mixing makes it possible to dilute the antimist particles by incorporating only the residual silicone phase.

The liquid silicone composition can naturally comprise other additives initially present in the silicone phase or incorporated during the mixing with the antimist particles.

According to a preferred method of combating the formation of mist, the following products are chosen as constituents of the silicone phase of the liquid coating composition:

POS (A): product exhibiting units of formula:

$$W_a Z_b SiO \frac{4-(a+b)}{2} \quad (A.1)$$

in which:

W is an alkenyl group, preferably a vinyl or alkyl group,

Z is a monovalent hydrocarbonaceous group which has no unfavorable effects on the activity of the catalyst and is preferably chosen from alkyl groups having from 1 to 8 carbon atoms inclusive, advantageously from the methyl, ethyl, propyl and 3,3,3-trifluoropropyl groups, and from aryl groups, and advantageously from the xylyl and tolyl and phenyl radicals, a is 1 or 2, b is 0, 1 or 2 and a+b is between 1 and 3, optionally at least a portion of the other units are units of mean formula:

$$Z_c SiO \frac{4-c}{2} \quad (A.2)$$

in which Z has the same meaning as above and c has a value of between 0 and 3, for example between 1 and 3; dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends or cyclic methylvinylpolysiloxanes being more especially selected;

POS (B): product exhibiting siloxyl units of formula:

$$H_d L_c SiO \frac{4-(d+c)}{2} \quad (B.1)$$

in which:

L is a monovalent hydrocarbonaceous group which has no unfavorable effects on the activity of the catalyst and is preferably chosen from alkyl groups having from 1 to 8 carbon atoms inclusive, and advantageously from the methyl, ethyl, propyl and 3,3,3-trifluoropropyl groups, and from aryl groups, and advantageously from the xylyl and tolyl and phenyl radicals, d is 1 or 2, c is 0, 1 or 2 and d+c has a value of between 1 and 3, optionally at least a portion of the other units being units of mean formula:

$$L_g SiO \frac{4-g}{2} \quad (B.2)$$

in which L has the same meaning as above and g has a value of between 0 and 3, and poly(dimethylsiloxane) (methylhydrosiloxy) (α,ω-dimethylhydro)siloxane being more especially selected.

These POSs can be of the type of those which crosslink at ambient temperature or with heat by polyaddition reactions in the presence of a metal catalyst, in this case based on platinum. These are crosslinkable POS compositions known as RTV ("Room Temperature Vulcanizing") compositions or polyaddition POS compositions known as TVE compositions, TVE being the abbreviation for "thermally vulcanizable elastomer".

RTV or TVE twin-component or single-component POS polyaddition compositions, polyaddition being essentially by reaction of hydrosilyl groups with alkenylsilyl groups generally in the presence of a metal catalyst (preferably a platinum catalyst), are disclosed, for example, in patents U.S. Pat. Nos. 3,220,972, 3,284,406, 3,436,366, 3,697,473 and 4,340,709.

According to one alternative form, the liquid silicone composition employed can be chosen from twin-component or single-component POS compositions which crosslink at ambient temperature by polycondensation reactions under the effect of moisture generally in the presence of a metal catalyst, for example a tin compound (RTV polycondensation). These compositions are disclosed, for example, in patents U.S. Pat. Nos. 3,065,194, 3,542,901, 3,779,986 and 4,417,042 and in patent FR-2 638 752 (single-component compositions) and in patents U.S. Pat. Nos. 3,678,002, 3,888,815, 3,933,729 and 4,064,096 (twin-component compositions).

The POSs which participate in these RTV polycondensation compositions are linear, branched or crosslinked polysiloxanes which carry hydroxyl groups or hydrolyzable groups, for example alkoxy groups. Similar compositions can additionally comprise a crosslinking agent which is in particular a roll carrying at least 3 hydrolyzable groups, such as, for example, a silicate, an alkyltrialkoxysilane or an aminoalkyltrialkoxysilane.

The liquid silicone coating composition can also comprise one or more POSs which can be crosslinked by the cationic or radical route
    in the presence of an effective amount of cationic initiating systems (thermal initiators and/or photoinitiators), initiators of the organometallic complex or onium borate type, proton-donating organic solvents (isopropyl alcohol, benzyl alcohol, and the like),
    and/or, depending on the situation, in the presence of a radical initiator via activation by actinic (UV) radiation or by electron beams.

These POSs are, for example, epoxysilicones and/or vinyl ether silicones, which may be linear or cyclic.

Such epoxy- or vinyloxyfunctional POSs are disclosed in particular in patents DE-4 009 889, EP-0 396 130, EP-0 355 381, EP-0 105 341, FR-2 110 115 and FR-2 526 800.

The epoxyfunctional POSs can be prepared by hydrosilylation reactions between oils comprising SiH units and epoxyfunctional compounds, such as 4-vinylcyclohexenone or allyl glycidyl ether.

The vinyloxyfunctional POSs can be prepared by hydrosilylation reaction between oils comprising SiH units and vinyloxyfunctional compounds, such as allyl vinyl ether or allylvinyloxyethoxybenzene.

In addition to these POSs, the liquid silicone coating composition can also comprise:
    at least one adhesion promoter (E)
    and/or at least additive (F) which is standard in silicone compositions which crosslink by polyaddition, by polycondensation, by the cationic route or by the radical route.

Mention may be made, as regards the additives (F), of:
    for the RTV POS polyaddition compositions:
        retarders of the addition reaction (e.g. tetramethylvinyltetrasiloxane, pyridine, phosphines, phosphites, unsaturated amides and acetylenic alcohols;
    for the RTV or TVE POS compositions:
        crosslinking agents, such as alkyltrialkoxysilane, alkyl silicates, alkyl polysilicates (methyl silicate, ethyl silicate, isopropyl silicate, n-propyl silicate and the like);
    for the POSs which can be crosslinked by the cationic and/or radical route by activation under radiation or electron beams:
        epoxyether diluents,
        pigments of the following types: carbon black, titanium dioxide, phthalocyanine, benzimidazolone, naphthone, diazopyrazolone, and the like,
        photosensitizers chosen from (poly(aromatic) products, which are optionally metallic, and heterocyclic products (phenotiazin, tetracene, perilene, anthracene, xantopinacol, thioxantone, and the like);
    and generally, for all the POSs:
        pigments,
        α-olefins,
        stabilizers, comprising in particular the appropriate surface-active agents which can be used for emulsified coating compositions.

The liquid silicone coating composition is advantageously a silicone oil:
which comprises one or more POSs (A), optionally a compound (B) and optionally a diluent and/or a solvent (Di), and which is charged with antimist particles.

Mention may be made, as examples of diluent and/or of solvent (Di), of aliphatic or aromatic solvents, chlorinated solvents, e.g. white spirit, ketones, advantageously methyl ethyl ketone or acetone, alcohols, advantageously isopropanol or n-butyl alcohol, saturated, unsaturated or aromatic hydrocarbons, advantageously pentane, hexane, heptane, octane, toluene, xylene, benzene, "naphtha" petroleum fractions or C7–C8 petroleum fractions (in particular gasoline E), halogenated hydrocarbons and their mixtures.

According to one alternative form, the liquid silicone coating composition is an aqueous emulsion of a silicone phase based on compounds (A) and (B) which is optionally charged with antimist particles.

These silicone emulsions are obtained in a way known per se, for example as disclosed in French Patent Application No. 97 16872, the content of which is incorporated in the present account by reference.

According to another of its aspects, the invention relates to the use of noncellulose particles as antimist additives in crosslinkable liquid silicone compositions intended for the coating of flexible supports in order to form crosslinked coatings using a roll coating device, so as to combat the appearance of mist during the coating, characterized in that the antimist particles are as defined above.

Finally, the invention is also targeted at a process for coating flexible supports with at least one liquid silicone composition which is a precursor of silicone coating(s), this coating being carried out using a roll coating device, characterized in that recourse is had to the process for combating the appearance of mist (misting) as defined above.

It is thus apparent that the invention provides a novel, simple, economical and reliable means for combating the production of mist during the coating of flexible supports (for example of paper, of film or of polymer film) with a crosslinkable liquid silicone composition in roll coating devices operating at high speed. The practical industrial consequence is that the speeds of forward progression can be further increased without the appearance of this mist phenomenon, which is harmful to the quality of the coating. The combating means provided by the invention also has the not insignificant advantage of not harming the appearance qualities, the coverage, the adhesion-resistant properties and the mechanical properties (ruboff) of the crosslinked silicone coating which it is desired to obtain on at least one of the faces of the flexible support.

Furthermore, the reduction in the misting significantly improves the health and safety conditions for personnel stationed close to industrial devices for silicone coating on rolls operating at high speed.

The invention will be better understood in the light of the examples which follow.

EXAMPLES

In these examples, the viscosity is measured using a Brookfield viscometer according to the directions of AFNOR Standard NFT 76 106 of May 1982.

Treated titanium oxide NM 400™: it is in fact Hombitec RM 400™ treated titanium oxide from Hombitec.

Information on the AMPs employed in the examples is given in Table 1 below.

The silicone coating liquid is poured directly into the gap between the two rolls. The amount of fluid used is 1 ml.

Various compositions were subsequently prepared by mixing a silicone polymer:

either a polymer P1 formed of polydimethylsiloxane, the ends of which are blocked by a dimethylvinylsiloxy group and the viscosity of which is approximately 600 mPa·s, or a polymer P2 formed of polydimethylsiloxane, the ends of which are blocked by a dimethylvinylsiloxy group and the viscosity of which is 220 mPa·s, and various particulate fillers.

The mixture thus obtained is homogenized on a drum roller for at least three hours. The rotary system described in the preceding paragraph is subsequently used, the preparation in question being spread over the rolls of which. The rotational speed of the rolls is then gradually increased and the tangential speed from which the appearance of the mist is visually detected is recorded. The results obtained are collated in Table 2 below.

TABLE 1

AMPS EMPLOYED IN THE EXAMPLES

| Nature | Tradename | Supplier | Size $D_{50}$ ($\mu$m) | Determination Technique | BET specific surface area (SS) ($m^2/g$) |
|---|---|---|---|---|---|
| Talc | Finntalc ™ MO$_3$ | Mondominerals | 1.0 | Sedimentation (Sedigraph 5100) | 10–15 |
| Talc | Steamic 00S ™ | Luzenac Group | 1.8 | Sedimentation (Sedigraph 5100) | 11–13 |
| Talc | WCD 2610 | Whittaker | 0.8 | Sedimentation (Sedigraph 5100) | 10–15 |
| Talc | 1745 | Whittaker | 5.5 | Sedimentation (Sedigraph 5100) | 4–6 |
| Talc | Finntalc M40 | Mondominerals | 15.0 | Sedimentation (Sedigraph 5100) | 2–4 |
| Kaolin | WCD 2474 | Mondominerals | 1.4 | Sedimentation (Sedigraph 5100) | 7–9 |
| Precipitated silica 170 | FK 383 DS | Degussa | 5.0 | Laser diffraction (Coultronics LS 130) | 170 |
| Pyrogenic silica 200 | A 200 | Degussa | 0.2 | Laser diffraction (Coultronics LS 130) | 200 |
| TiO$_2$ | Nm 400 ™ | Hombitec | — | — | — |

Examples (1–10)

Influence of the Level of Talc AMP

Device Employed

To analyze and quantify the mist produced in a roll coating device operating at high speed, use is made on the laboratory scale of a two-roll device operating reproducibly at a linear speed of between 0 and 900 m/min. Furthermore, a sufficiently powerful light projector is installed so as to illuminate both the two rolls and to be able to observe from what rotational speed of the rolls the mist becomes visually detectable.

The 2 rolls have a diameter of 10 cm. One of the rolls is covered with rubber and the other roll is chromium plated. The rubber roll has the shape of a dumbbell so that the speed of the two rolls is synchronous. These rolls, which can be driven by a motor, are in contact under constant pressure.

TABLE 2

Influence of the level of AMP

| | Polymer Pi (i = 1 or i = 2) | Nature of the Antimist Particles (AMPs) | Percentage of AMPs (%) | Viscosity (mPa · s) | Misting (m/min) |
|---|---|---|---|---|---|
| Example 1 | Polymer P1 (control) | — | | 640 | 140 |
| Example 2 | Polymer P1 | Talc, Finntalc M03 ™ | 1 | 600 | 210 |
| Example 3 | Polymer P1 | Talc, Finntalc M03 ™ | 2 | 660 | 260 |

TABLE 2-continued

Influence of the level of AMP

|  | Polymer Pi (i = 1 or i = 2) | Nature of the Antimist Particles (AMPs) | Percentage of AMPs (%) | Viscosity (mPa · s) | Misting (m/min) |
| --- | --- | --- | --- | --- | --- |
| Example 4 | Polymer P1 | Talc, Finntalc M03 ™ | 3 | 780 | 230 |
| Example 5 | Polymer P1 | Talc, Finntalc M03 ™ | 5 | 1 040 | 220 |
| Example 6 | Polymer P1 | Talc, Finntalc M03 ™ | 8 | 1 400 | 310 |
| Example 7 | Polymer P1 | Talc, Steamic OOS ™ | 1 | 660 | 200 |
| Example 8 | Polymer P1 | Talc, Steamic OOS ™ | 2 | 700 | 235 |
| Example 9 | Polymer P1 | Talc, Steamic OOS ™ | 5 | 740 | 250 |
| Example 10 | Polymer P1 | Talc, Steamic OOS ™ | 8 | 780 | 300 |

Examples 2 to 10, compared with Example 1, show that the addition of solid particles to a silicone composition makes it possible to slow down the speed at which the mist appears and that consequently these solid particles can be regarded as mist-reducing agent

Examples 11 to 15

Influence of the Level of Silica AMPs

A silicone polymer P2 formed of polydimethylsiloxane, the ends of which are blocked by a dimethylvinylsiloxy group the viscosity of which is 200 mPa·s, is poured into a mixer manufactured by Janke & Kunkel IKA-Labortechnik. Silica A 200™ is incorporated portionwise at ambient temperature until the mixture is composed of 10% by weight of silica A 200 and of 90% by weight of polymer P2 while stirring by means of a rotor, the rotational speed of which is approximately 100 rev/min. The incorporation time lasts approximately ½ hour. Once incorporation is complete, the mixture is stirred for yet an additional hour at ambient temperature. The mixture is subsequently heated at 150° C. for three hours while stirring. At the end of these three hours, a mixture M1 comprising 10% of silica is obtained, which mixture is allowed to cool.

A silicone polymer P2 formed of polydimethylsiloxane, the ends of which are blocked by a dimethylvinylsiloxy group the viscosity of which is 200 mPa·s, is poured into a mixer manufactured by Janke & Kunkel IKA-Labortechnik. Silica surface-treated with octamethylcyclotetrasiloxane (D4) is incorporated portionwise at ambient temperature until the mixture is composed of 10% by weight of treated silica and of 90% by weight of polymer P2 while stirring by means of a rotor, the rotational speed of which is approximately 100 rev/min. The incorporation time lasts approximately ½ hour. Once incorporation is complete, the mixture is stirred for yet an additional hour at ambient temperature. The mixture is subsequently heated at 150° C. for three hours while stirring. At the end of these three hours, a mixture M2 comprising 10% of treated silica is obtained, which mixture is allowed to cool.

90 parts by weight of the polymer P2 and 10 parts by weight of the mixture M1 are mixed by means of a drum roller for 3 hours; the bath B1 comprising 1% of silica is obtained.

70 parts by weight of the polymer P2 and 30 parts by weight of the mixture M1 are mixed by means of a drum roller for 3 hours; the bath B1a comprising 3% of silica is obtained.

90 parts by weight of the polymer P2 and 10 parts by weight of the mixture M2 are mixed by means of a drum roller for 3 hours; the bath B2 comprising 1% of silica is obtained.

70 parts by weight of the polymer P2 and 30 parts by weight of the mixture M2 are mixed by means of a drum roller for 3 hours; the bath B2a comprising 3% of silica is obtained.

The rotary system described in the preceding paragraph is subsequently used, 0.25 ml of the preparations B1, B1a, B2 and B2a in question being spread successively over the rolls of which. The rotational speed of the rolls is then gradually increased and the tangential speed from which the appearance of the mist is visually detected is recorded. The results obtained are collated in Table 3 below.

TABLE 3

INFLUENCE OF THE LEVEL OF SILICA AMP

|  | Products | Nature of the Antimist Particles (AMPs) | Percentage of AMPs (%) | Viscosity (mPa · s) | Misting (m/min) |
| --- | --- | --- | --- | --- | --- |
| Example 11 | Polymer P2 (control) | — | 0 | 200 | 261 |
| Example 12 | Bath B1 | Silica A 200 ™ | 1 | 240 | 368 |
| Example 13 | Bath B1a | Silica A 200 ™ | 3 | 320 | 385 |
| Example 14 | Bath B2 | Silica surface-treated with D4 | 1 | 280 | 353 |
| Example 15 | Bath B2a | Silica surface-treated with D4 | 3 | 384 | 333 |

Examples 12 to 15, compared with Example 11, show that the addition of silica AMPs to a silicone composition makes it possible to slow down the speed at which the mist appears and that consequently these solid particles can be regarded as mist-reducing agent.

Examples 16 to 20

Influence of the Size of the Talc AMPs

The tests are carried out in a Rayneri mixer with a POS with a viscosity of 700 mPa·s. The device used is a simple three-bladed propeller rotating at a speed of 840 revolutions/ min. The incorporation of the filler and the homogenization of the mixture take place at ambient temperature over 15 minutes.

The mixtures thus prepared are immediately tested on the plant described above.

The amount of silicone coating liquid employed is 1 ml.

The results obtained are collated in Table 4 below.

TABLE 4

INFLUENCE OF THE SIZE OF THE AMPs

| Examples | Polymer | Nature of the AMPs | Level (%) | Viscosity (mPa · s) | Misting, speed at which the mist is visually detected (m/min) |
|---|---|---|---|---|---|
| 16 | P1 | Control | 0 | 700 | 120 |
| 17 | P1 | Micronized talc WCD 2610 | 3 | 830 | 170 |
| 18 | P1 | Talc, FinnTalc MO3 | 3 | 820 | 175 |
| 19 | P1 | Talc 1745 | 3 | 780 | 170 |
| 20 | P1 | Talc, FinnTalc M40 | 3 | 720 | 120 |

This table illustrates very well the role played by the size of the particles for the same level and the same nature of additive. For viscosities which are not very much affected by the presence of the filler (the finer the filler, the more it increases the viscosity of the silicone medium), it will be noted that the speed of appearance of the misting is slowed down when the particle size remains below 5 μm.

Comparison of Examples 17, 18 and 19 and Examples 16 and 20 show that the AMPs with a size of between 0.8 and 5.0 μm reduce the misting in comparison with the case where particles of talc with a size $D_{50}$ equal to 15 μm are not present.

Examples 21 to 27

Influence of the Nature of the AMPs

The conditions for the preparation of the products in Table 5 are the same as above.

TABLE 5

INFLUENCE OF THE NATURE OF THE AMPs

| Examples | Polymer | Nature of the AMPs | Level (%) | Viscosity (mPa · s) | Misting (m/min) |
|---|---|---|---|---|---|
| 21 | P1 (control) | | 0 | 700 | 120 |
| 22 | P1 | Talc, FinnTalc MO3 | 3 | 820 | 175 |
| 23 | P1 | Kaolin WCD 2474 | 3 | 760 | 190 |
| 24 | P1 | Precipitated silica FK 383 DS | 1 | 820 | 175 |
| 25 | P1 | Fumed silica A200 | 1 | 1690 | 170 |
| 26 | P1 (control) | | | 610 | 120 |
| 27 | P1 | Treated titanium dioxide NM 400 ™ | 3 | 800 | 190 |

The table shows 5 examples of AMPs with different origins and/or chemical natures, also having different shape factors but for which the size remains below 5 μm. These AMPs make it possible to slow down the appearance of the misting phenomenon.

Examples (28–34)

Polyaddition Silicone Industrial Trials

Seven baths are prepared in the following way.

Bath 1 is obtained by successively mixing the following products:
a polymer 1 formed of polydimethylsiloxane, the ends of which are blocked by a dimethylvinylsiloxy group, the viscosity of which is 200 mPa·s and which comprises less than 0.20% of 1-ethynylcyclohexanol,
a mixture of oils composed of copolymers of polyhydromethylsiloxane and of polydimethylsiloxane, the two types of copolymers being blocked by trimethylsiloxane groups,
a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups of 1.75, a platinum concentration of 110 ppm and a level of 1-ethynylcyclohexanol of the order of 0.15% are obtained. The viscosity of the mixture obtained is approximately 205 mPa·s.

Bath 2 is obtained by successively mixing the following products:
a polymer 2 formed of polydimethylsiloxane, the ends of which are blocked by a dimethylvinylsiloxy group, the viscosity of which is 150 mPa·s and which comprises less than 0.20% of 1-ethynylcyclohexanol,
a mixture of oils composed of copolymers of polyhydromethylsiloxane and of polydimethylsiloxane, the two types of copolymers being blocked by trimethylsiloxane groups,
a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups of 1.75, a platinum concentration of 110 ppm and a level of 1-ethynylcyclohexanol of the order of 0.15% are obtained. The viscosity of the mixture obtained is approximately 158 mPa·s.

Bath 3 is obtained by successively mixing the following products:
a polymer 3 formed of polydimethylsiloxane, the ends of which are blocked by a dimethylvinylsiloxy group, the viscosity of which is 100 mPa·s and which comprises less than 0.20% of 1-ethynylcyclohexanol,
a mixture of oils composed of copolymers of polyhydromethylsiloxane and of polydimethylsiloxane, the two types of copolymers being blocked by trimethylsiloxane groups,
a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups of 1.75, a platinum concentration of 110 ppm and a level of 1-ethynylcyclohexanol of the order of 0.15% are obtained. The viscosity of the mixture obtained is approximately 110 mPa·s.

Bath 4 is obtained by successively mixing the following products:
a polymer 4 formed of polydimethylsiloxane, the ends of which are blocked by a dimethylvinylsiloxy group, the viscosity of which is 50 mPa·s and which comprises less than 0.20% of 1-ethynylcyclohexanol, a mixture of oils composed of copolymers of polyhydromethylsiloxane and of polydimethylsiloxane, the two types of copolymers being blocked by trimethylsiloxane groups, a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups of 1.75, a platinum concentration of 110 ppm and a level of 1-ethynylcyclohexanol of the order of 0.15% are obtained. The viscosity of the mixture obtained is approximately 78 mPa·s.

Bath 5 is obtained in the following way.

The polymer 1 which has been used to prepare bath 1 is poured into a mixer manufactured by Janke & Kunkel IKA-Labortechnik. Silica A 200™ is incorporated portionwise at ambient temperature until the mixture is composed of 10% by weight of silica A 200 and of 90% by weight of polymer P1 while stirring by means of a rotor, the rotational speed of which is approximately 100 revolutions/min. The incorporation time lasts approximately ½ hour. Once incorporation is complete, the mixture is stirred for yet an additional hour at ambient temperature. The mixture is subsequently heated at 150° C. for three hours while stirring. At the end of these three hours, a mixture 5.1 comprising 10% of silica is obtained, which mixture is allowed to cool. 10.4 kg of the mixture 5.1 is mixed into 3.6 kg of the polymer 1 which has been used to prepare the bath and a mixture 5.2 is obtained.

Bath 5 is obtained by successively mixing the following products:

the mixture 5.2, a mixture of oils composed of copolymers of polyhydromethylsiloxane and of polydimethylsiloxane, the two types of copolymers being blocked by trimethylsiloxane groups, a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups of 1.75, a platinum concentration of between 110 ppm and a level of 1-ethynylcyclohexanol of the order of 0.15% are obtained. The viscosity of bath 5 obtained is approximately 290 mPa·s.

Bath 6 is obtained in the following way.

9% of Finntalc MO3™ talc, which is dispersed by means of a Turrax™ mixer, are incorporated in the polymer 1 which has been used to prepare bath 1. A mixture 6.1 with a viscosity of approximately 600 mPa·s is obtained. 3.3 kg of the mixture 6.1 are mixed into 6.7 kg of the polymer 1 which has been used to prepare bath 1 and a mixture 6.2 is obtained.

Bath 6 is obtained by successively mixing the following products:

the mixture 6.2, a mixture of oils composed of copolymers of polyhydromethylsiloxane and of polydimethylsiloxane, the two types of copolymers being blocked by trimethylsiloxane groups, a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups 1.75, a platinum concentration of 110 ppm and a level of 1-ethynylcyclohexanol of the order of 0.15% are obtained. The viscosity of bath 6 obtained is approximately 250 mPa·s.

Bath 7 is obtained in the following way.

7% of Steamic 00S™ talc, which is dispersed by means of a Turrax™ mixer, are incorporated in the polymer 1 which has been used to prepare bath 1. A mixture 7.1 with a viscosity of approximately 440 mPa·s is obtained. 4.3 kg of the mixture 7.1 are mixed into 5.7 kg of the polymer 1 which has been used to prepare bath 1 and a mixture 7.2 is obtained.

Bath 7 is obtained by successively mixing the following products:

the mixture 7.2, a mixture of oils composed of copolymers of polyhydromethylsiloxane and of polydimethylsiloxane, the two types of copolymers being blocked by trimethylsiloxane groups, a catalyst comprising Pt with a zero oxidation number, commonly known as the Karsted catalyst, dissolved in divinyltetramethyldisiloxane.

The proportions of the mixture are calculated so that, in the final bath, a ratio of the total number, as moles, of vinyl groups to the total number, as mole, of hydrosiloxane groups 1.75, a concentration of 110 ppm and a level of 1-ethynylcyclohexanol of the order of 0.15% are obtained. The viscosity of bath 6 obtained is approximately 248 mPa·s.

These seven baths are subsequently used successively to coat a paper support (glassine of 62 g/m$^2$) supplied by Ahlström by means of a machine, the coating head of which is a head equipped with four wet rolls. Downstream of this head, a drying section in which air circulates at approximately 195° C. is used to cure the silicone coating by bringing it to a maximum temperature of between 130 and 160° C.

The coating operation is subsequently carried out by successively using baths 1, 2, 3, 4, 5, 6 and 7 described above. The speed of forward progression of the paper and the tangential speed of the coating roll, for each bath, varies from 300 m/min to 900 m/min in order to evaluate the effect of the composition of the bath on the density of the mist. The density of the mist is evaluated in two way.

1) A qualitative method is used which consists in gradually increasing the speed of forward progression of the paper and in recording the speed from which the mist becomes visible (without particular effort).

2) A quantitative method is used which consists in gradually increasing the speed of forward progression of the paper and in measuring the density of the mist emitted in the vicinity of the coating head. To do this, a device used to measure the mist is positioned approximately ten centimeters from the point of contact between the final wet roll of the coating head and the coated paper, that is to say where the paper progresses forward between the coating roll and the pressure roll; this measuring instrument is a particle counter, also known as a nephelometer, the operating principle of which is based on an optical system which makes it possible to measure, by diffraction or by an equivalent principle, the number of particles passing through a light beam. As the device delivers a number of particles greater than a given size via 15 measurement channels each corresponding to sizes ranging between 0.3 μm and 20 μm, the calculation described below is carried out to evaluate the density d of the mist. If ni (1/1) is the number of particles per unit of volume detected by the ith channel, the size of which is greater than $\Phi i$ ($\mu$m), the density d (mg/m$^3$) of the mist is calculated by the following formula:

$$d = (-0.8/1000000) \cdot \sum_i \frac{\{(ni+1-ni) \cdot [(\Phi i + (\Phi i + 1)/2) \cdot 3] \cdot (\pi/6)\}}{i}$$

The results obtained are collated in Table 6 below:

TABLE 6

TRIALS ON A POLYADDITION SILICONE INDUSTRIAL PLANT

| Example | Designation of the bath | Viscosity of the bath (mPa · s) | Silicone deposition (g/m$^2$) | AMP | Speed at which the mist is visually detected (m/min) | Speed at which the density of the mist is measured (m/min) | Density of the mist measured at the corresponding speed (mg/m$^3$) | Level of adhesion resistance obtained, measured according to the FTM 10 method |
|---|---|---|---|---|---|---|---|---|
| Example 28 | Bath 1 | 205 | 1.18–1.22 | — | 400 | 600 | 38 | 5.6 cN/25 min |
| Example 29 | Bath 2 | 158 | 0.98–1.05 | — | 500 | 600 | 24 | — |
| Example 30 | Bath 3 | 110 | 0.96 | — | 600–700 | 800 | 16 | — |
| Example 31 | Bath 4 | 79 | 0.81 | — | 700–800 | 800 | 12 | 11.4 cN/25 min |
| Example 32 | Bath 5 | 290 | 1.28–1.33 | Silica A200 | 780 | 800 | 15 | 4.4 cN/25 min |
| Example 33 | Bath 6 | 250 | 1.02 | Talc, Finntalc MO3 ™ | 600 | 600 | 5 | 6.8 cN/25 min |
| Example 34 | Bath 7 | 248 | 1.25 | Talc, Steamic OOS ™ | 500 | 600 | 20 | — |

Examples 28 to 31 show that the density of the mist decreases when the viscosity of the coating bath decreases. Examples 32 to 34 show that the presence of solid particles in the coating bath makes it possible to reduce the intensity of the mist or that, which is equivalent, the addition of solid particles to a coating bath makes it possible to achieve a higher operating speed of the machine than in the absence of solid particles for the same density of mist, independently of the viscosity of the bath.

Demonstration of the positive effect of the process according to the invention on the coverage of the silicone coating obtained in Examples 33 and 34.

The silicone-coated surface of the samples is brought into contact for 30 seconds with an aqueous solution comprising malachite green. The coloration thus obtained reveals the coverage of the paper by the silicone, that is to say the quality and the continuity of the silicone layer. Thus, if the coloration is strong, the dye has easily been able to pass through the silicone layer and the coverage is described as poor. On the other hand, if the coloration is slight or nonexistent, the dye has not been able or has only been able to a slight extent to pass through the silicone layer, which means that the coverage is good. This characteristic is useful to a person skilled in the art as it allows him to evaluate the quality of the coating with regard to the adhesion-resistant properties and/or, which is equivalent, the economic balance of the silicone-coating operation, as a silicone composition resulting in good coverage makes it possible to reduce the amount of silicone used. In particular, in this instance, it has been observed that the coverage improves in parallel with the reduction in the misting. This is interpreted by considering that the misting is related to a disruption of the silicone layer at the point of contact between the support and the coating roll, that is to say that the appearance of aerosol droplets is generated by the breaking of liquid strands (threading). When the misting is reduced by virtue of the use of the AMPs described above, the stretching of the strands and other disruptions which are the cause of the misting are limited for this reason. It is thus understood that, if the misting and concomitantly the disruptions of the coating layer are reduced by virtue of the use of the AMPs described above, the coverage is improved in the same way.

Examples 35 to 42

Industrial Trials on a Silicone Which Can Be Crosslinked Under UV Radiation

3% of pyrogenic silica A 200™, which is dispersed by means of a Turrax™ mixer, are incorporated in a product composed predominantly of a polydimethylsiloxane polymer, on the chain of which are grafted epoxy groups, with a viscosity of approximately 350 mPa·s of formula:

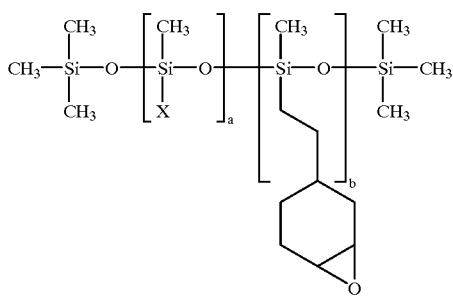

x=CH$_3$; a=70; b=7.

A mixture Add1 with a viscosity of approximately 760 mPa·s is obtained.

3% of pyrogenic silica A 200™, which is dispersed by means of a Turrax™ mixer, are incorporated in a polymer composed predominantly of a polydimethylsiloxane polymer, on the chain of which are grafted acrylate groups, with a viscosity of approximately 700 mPa·s. A mixture Add2 with a viscosity of approximately 1680 mPa·s is obtained.

Bath 1 is obtained by mixing the following compounds:

95 parts of a product a product composed predominantly of a polydimethylsiloxane polymer, on the chain of which are grafted epoxy groups, with a viscosity of approximately 350 mPa·s of formula:

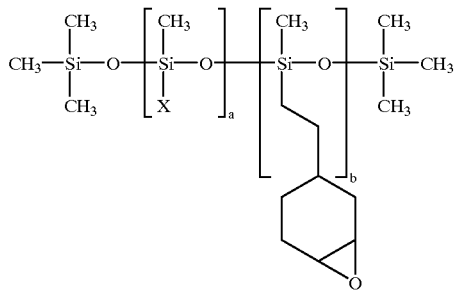

$x=CH_3$; $a=70$; $b=7$, 2.5 parts of the catalyst, composed of an 18% by weight solution in isopropyl alcohol of a product of formula:

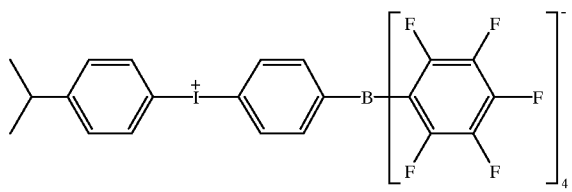

5 parts of a product composed predominantly of a polydimethylsiloxane polymer, on the chain of which are grafted epoxy groups, with a viscosity of approximately 600 mPa·s.

Bath 2 is obtained by mixing the following compounds:

61 parts of a product composed predominantly of a polydimethylsiloxane polymer, on the chain of which are grafted epoxy groups, with a viscosity of approximately 350 mPa·s, 34 parts of the Add1 mixture, 2.5 parts of the catalyst, composed of an 18% by weight solution in isopropyl alcohol of a product of formula:

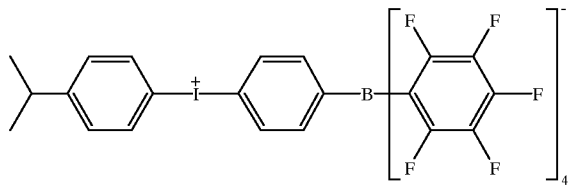

and 5 parts of a product composed predominantly of a polydimethylsiloxane polymer, on the chain of which are grafted epoxy groups, with a viscosity of approximately 600 mPa·s.

Bath 3 is obtained by mixing the following compounds:

90 parts of a polymer composed predominantly of a polydimethylsiloxane polymer, on the chain of which are grafted acrylate groups, with a viscosity of approximately 700 mPa·s, 10 parts of a polymer composed predominantly of a polydimethylsiloxane polymer, on the chain of which are grafted acrylate groups, with a viscosity of approximately 250 mPa·s, and 2 parts of a commercially available photoinitiator, operating under irradiation via free radicals, based on a mixture of α-hydroxylated ketones.

Bath 4 is obtained by mixing the following compounds:

56 parts of a polymer composed predominantly of a polydimethylsiloxane polymer, on the chain of which are grafted acrylate groups, with a viscosity of approximately 700 mPa·s, 34 parts of the Add2 mixture, 10 parts of a polymer composed predominantly of a polydimethylsiloxane polymer, on the chain of which are grafted acrylate groups, with a viscosity of approximately 250 mPa·s, 2 parts of a commercially available photoinitiator, operating under irradiation via free radicals, based on a mixture of α-hydroxylated ketones.

Baths 1 and 2 are subsequently used successively to coat a support of glassine paper by means of a machine, the coating head of which is a head equipped with four wet rolls. Likewise, baths 3 and 4 are used successively to coat a support of supercalendered kraft paper by means of the same machine. UV lamps are positioned downstream of this head for the purpose of curing the silicone composition, it being known that the UV lamps operate under a nitrogen atmosphere in the case of baths 3 and 4.

The coating operation is subsequently carried out by successively using baths 1, 2, 3 and 4 described above. The speed of forward progression of the paper and the tangential speed of the coating roll, for each bath, is either 400 m/min or 600 m/min or 1 000 m/min, this in order to evaluate the effect of the composition of the bath on the density of the mist. The density of the mist is evaluated in the following way.

A device used to measure the mist is positioned approximately ten centimeters from the point of contact between the final wet roll of the coating head and the coated paper, that is to say where the paper progresses forward between the coating roll and the pressure roll; this measuring instrument is a particle counter, also known as a nephelometer. Its operating principle is based on an optical system which makes it possible to measure, by diffraction or by an equivalent principle, the number of particles passing through a light beam. As the device delivers a number of particles greater than a given size via eight measurement channels each corresponding to sizes ranging between 0.75 µm and 15 µm, the calculation described below is carried out to evaluate the density d of the mist. If ni (1/1) is the number of particles per unit of volume detected by the ith channel, the size of which is greater than $\Phi_i$, (µm), the density d (mg/m³) of the mist is calculated by the following formula:

$$d = (-0.8/1000000) \cdot \sum_i \{(ni+1-ni) \cdot \frac{[(\Phi i + (\Phi i + 1)/2) \cdot 3] \cdot (\pi/6)\}}{i}$$

The results obtained are collated in Table 7 below.

TABLE 7

INDUSTRIAL TRIALS ON SILICONE WHICH CAN BE CROSSLINKED UNDER UV RADIATION

| | Designation of the bath | Viscosity of the bath (mPa·s) | Silicone deposition (g/m$^2$) | Speed at which the density of the mist is measured (m/min) | Density of the mist measured at the corresponding speed (mg/m$^3$) | Level of adhesion resistance obtained, measured after storage for one month |
|---|---|---|---|---|---|---|
| Example 35 | Bath 1 | 360 | 1.35 | 600 | 4.8 | 17.1 g/cm |
| Example 36 | Bath 1 | 360 | 1.55 | 1 000 | 65.3 | 20.4 g/cm |
| Example 37 | Bath 2 | 430 | 1.53 | 600 | 3.4 | 12.6 g/cm |
| Example 38 | Bath 2 | 430 | 1.59 | 1 000 | 12.3 | 19.6 g/cm |
| Example 39 | Bath 3 | 860 | 1.48 | 400 | 30.3 | 12.6 g/cm |
| Example 40 | Bath 3 | 860 | 1.30 | 600 | 84.0 | 16.5 g/cm |
| Example 41 | Bath 4 | 1 350 | 1.68 | 400 | 5.4 | 10.7 g/cm |
| Example 42 | Bath 4 | 1 350 | 1.61 | 600 | 13.3 | 17.5 g/cm |

Example 35 compared with Example 37, Example 36 compared with Example 38, Example 39 compared with Example 41 and Example 40 compared with Example 42 show that the use of silica makes it possible to reduce the misting. These same examples also show that the use of silica, far from being harmful to the adhesion-resistant properties of the silicone coating, in some cases makes it possible to improve it.

These examples, compared with the preceding Examples 30 to 36, show that silica makes it possible to reduce the misting of silicones independently of the type of chemical groups grafted to the silicone polymer and independently of the chemical mechanism which governs their reaction.

What is claimed is:

1. Process for combating the appearance of mist (misting) during the coating of flexible supports with at least one liquid silicone composition, said process comprising applying a liquid silicone coating composition to a flexible support with a roll coating device, the liquid silicone coating composition being obtained by mixing (a) a silicone phase having a viscosity η at 25° C. of less than 2000 mPa·s comprising:
   A—at least one polyorganosiloxane (POS) capable of cross-linking;
   B—optionally at least one crosslinking organosilicon compound;
   C—optionally at least one catalyst of the crosslinking reaction; with
   (b) noncellulose antimist particles, the particle size of which, given by their $D_{50}$ (in μm), is such that:

$D_{50} \leq 10$, these antimist particles being incorporated in the liquid silicone composition in a proportion of at most 30% by weight, and
optionally with a liquid compound (D) comprising:
   i. a diluent and/or a solvent comprising a non-organosilicon or organosilicon organic compound which optionally is capable of reacting with the polyorganosiloxane (A), and/or
   ii. water.

2. Process according to claim 1, wherein the antimist particles are selected from the group consisting of:
   carbon black
   $SiO_2$
   $CaCO_3$
   $TiO_2$
   $BaSO_4$
   $Al_2O_3$
   lime
   talc
   mica
   ground quartz
   natural or synthetic clays
   powders based on synthetic polymer(s) other than a cellulose polymer
   diatomaceous earths
   and their mixtures; these particles optionally having been subjected to a surface treatment.

3. Process according to claim 1, wherein the particles have a BET specific surface area (SS) of between 0.5 m$^2$/g and 500 m$^2$/g.

4. Process according to claim 1, wherein at least a portion of the silicone phase is mixed with all or a portion of the antimist particles, which are provided in the dry pulverulent form and/or in the form of a suspension in a organic or aqueous liquid.

5. Process according to claim 1, wherein:
   either all the antimist particles are gradually mixed with the silicone phase in the continuous or dispersed form;
   or all the antimist particles are gradually mixed with a fraction of the POS (A), this intermediate mixture subsequently being mixed with the silicone phase, in the continuous or dispersed form, comprising the residual fraction of the silicone phase.

6. Process according to claim 1, wherein the silicone phase/antimist particles mixing is carried out using a mixer known for dispersing in fluid media when operating at ambient temperature.

7. Process according to claim 1,
wherein the antimist particles are based on treated or untreated pyrogenic and/or precipitated silica,
in that, in a first step, a portion of the silicone phase, in the continuous form, is gradually mixed with the siliceous antimist particles in a mixer, known for dispersing in fluid media and with a rotational speed of between 50 and 500 rev/mm, at an ambient temperature for at least one hour,
in a second step, the mixture thus obtained is brought with stirring to a temperature of between 100 and 200° C. for at least one hour,
and in a third step, at least one mixing of the remainder of the silicone phase with the mixture obtained in the second step is carried out,
this additional mixing operation(s) being carried out at ambient temperature.

8. Process according to claim 1, wherein the following products are chosen as constituents of the silicone phase:
POS (A): product exhibiting units of formula:

$$W_a Z_b SiO \frac{4-(a+b)}{2} \quad (A.1)$$

in which:
W is an alkenyl group,
Z is a monovalent hydrocarbonaceous group which has no adverse effect on the activity of the catalyst (C),
a is 1 or 2, b is 0, 1 or 2 and a+b is between 1 and 3,
optionally at least a portion of the other units are units of mean formula:

$$Z_c SiO \frac{4-c}{2} \quad (A.2)$$

in which Z has the same meaning as above and c has a value of between 0 and 3; and
POS (B): product exhibiting siloxyl units of formula:

$$H_d L_c SiO \frac{4-(d+c)}{2} \quad (B.1)$$

in which:
L is a monovalent hydrocarbonaceous group which has no adverse effect on the activity of the catalyst (C),
d is 1 or 2, c is 0, 1 or 2 and d+c has a value of between 1 and 3,
optionally at least a portion of the other units being units of mean formula:

$$L_g SiO \frac{4-g}{2} \quad (B.2)$$

in which L has the same meaning as above and g has a value of between 0 and 3.

9. Process according to claim 8, wherein W is a vinyl.

10. Process according to claim 8, wherein Z is chosen from alkyl groups having from 1 to 8 carbon atoms inclusive.

11. Process according to claim 8, wherein Z is chosen from the methyl, ethyl, propyl and 3,3,3-trifluoropropyl groups and from aryl groups.

12. Process according to claim 11, wherein Z is chosen from the xylyl, tolyl and phenyl radicals.

13. Process according to claim 8, wherein POS (A) is chosen from dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends or cyclic methylvinylpolysiloxanes.

14. Process according to claim 8, wherein L is chosen from alkyl groups having from 1 to 8 carbon atoms inclusive.

15. Process according to claim 8, wherein L is chosen from the methyl, ethyl, propyl and 3,3,3-trifluoropropyl groups and from aryl groups.

16. Process according to claim 15, wherein L is chosen from the xylyl and tolyl and phenyl radicals.

17. Process according to claim 16, wherein POS (B) is poly(dimethylsiloxy)(methylhydrosiloxy)($\alpha,\omega$)-dimethylhydro)siloxane.

18. Process according to claim 1, wherein the choice is made, as constituents of the silicone phase, of one or more POSs which can be crosslinked by the cationic or radical route,
in the presence of an effective amount of cationic initiating systems, organometallic complex or onium borate initiators, proton-donating organic solvents,
and/or, in the presence of a radical initiator via activation by actinic (UV) radiation or by electron beams.

19. Process according to claim 18, wherein the POSs are epoxysilicones and/or vinyl ether silicones, which may be linear or cyclic.

20. Process according to claim 1, wherein the liquid silicone coating composition additionally comprises:
at least one adhesion promoter (E)
and/or at least additive (F) which crosslinks by polyaddition, by polycondensation, by the cationic route or by the radical route.

21. Process according to claim 1, wherein the liquid silicone coating composition comprises a diluent and/or a solvent (Di).

22. Process according to claim 1, wherein the liquid silicon coating composition comprises water (Dii) and is an aqueous emulsion.

23. A process according to claim 2, wherein the natural or synthetic clays are selected from kaolin and expanded or nonexpanded vermiculite.

24. A process according to claim 8, wherein c in formula (A.2) has a value between 1 and 3.

* * * * *